United States Patent
Lässle

[11] Patent Number: 5,963,445
[45] Date of Patent: Oct. 5, 1999

[54] METHOD FOR THE PRODUCTION OF ACTUATOR SIGNALS

[75] Inventor: Hans-Peter Lässle, Usingen, Germany

[73] Assignee: VDO Adolf Schindling AG, Frankfurt, Germany

[21] Appl. No.: 08/752,851

[22] Filed: Nov. 21, 1996

[30] Foreign Application Priority Data

Nov. 21, 1995 [DE] Germany .......................... 195 43 373

[51] Int. Cl.$^6$ .............................. G05B 11/01; F16H 61/04
[52] U.S. Cl. ...................... 364/140.02; 477/148; 477/155
[58] Field of Search ..................................... 364/130, 140, 364/140.01–140.03; 477/148, 155

[56] References Cited

U.S. PATENT DOCUMENTS

| | | | |
|---|---|---|---|
| 4,310,889 | 1/1982 | Imai et al. ............................. | 364/431 |
| 4,858,101 | 8/1989 | Stewart et al. .......................... | 364/131 |
| 5,297,019 | 3/1994 | Zuehlke ................................. | 364/140 |
| 5,415,606 | 5/1995 | Kovalsky et al. ...................... | 477/148 |

*Primary Examiner*—William Grant
*Assistant Examiner*—Carolyn T. Baumgardner
*Attorney, Agent, or Firm*—Martin A. Farber

[57] ABSTRACT

In a method for the production of actuator signals as a function of sensor signals in an open-loop and/or closed-loop control system, the sensor signals are read into a data processing device and converted into internal input signals. The internal input signals are evaluated together with stored status information with the use of predetermined functions, whereby internal output signals and possibly new status information to be stored result. Actuator signals are derived from the internal output signals and fed to at least one actuator.

9 Claims, 2 Drawing Sheets

METHOD FOR THE PRODUCTION OF ACTUATOR SIGNALS

FIELD AND BACKGROUND OF THE INVENTION

The present invention relates to a method of producing actuator signals as a function of sensor signals in an open-loop and/or closed-loop control system.

In open-loop and/or closed-loop control systems, signals are processed by at least one sensor in accordance with predetermined functions, whereby signals for actuators are produced.

SUMMARY OF THE INVENTION

It is an object of the present invention to utilize the resources of a given data processing device as advantageously as possible.

According to the invention, the sensor signals are read into a data processing device and converted into internal input signals, the internal input signals are evaluated together with stored status information with the use of predetermined functions to provide internal output signals and possibly new status information to be stored, and actuator signals are derived from the internal output signals and delivered to at least one actuator.

One important field of use of the method of the invention comprises open-loop or closed-loop controls in a motor vehicle, which, however, does not exclude uses in other fields.

Particularly in the case of complex functions and a plurality of sensor signals, an excessively long period of time, as compared with the response time, has been necessary, heretofore, in order for the open-loop and/or closed-loop control system to process the sensor signals. In accordance with a feature of the invention, the program cycle time and thus the reaction time are reduced via an entry of the sensor signals which is dependent on the internal status information, and/or that a forwarding of actuator signals to the at least one actuator is dependent on the internal status information.

Frequently several open-loop and/or closed-loop control systems are used, which despite different tasks can use common sensor signals or possibly also control the same actuators. In a further development of the method of the invention in which several data processing devices are connected together by a bus system, the internal input signals and the internal output signals and the internal status information are transmitted when required, from a specific data processing device which produces the signals and information, to at least one other data processing device via the bus system.

One advantageous embodiment of this further development is that, in addition, sensor request signals and actuator request signals are transmitted over the bus system. In this way, the result is obtained that other data processing devices can use these signals and process them further.

In another embodiment it is provided that, after a successful interrogation (request) of an actuator by a data processing device, the interrogated actuator is blocked for other data processing devices. In this way, several functional modules are prevented from having access simultaneously to an actuator, and that the latter is prevented from incorrect control. In order that all data processing devices can respond properly, it can furthermore be provided that status signals which contain a block and a release of an actuator are transmitted over the bus system.

BRIEF DESCRIPTION OF THE DRAWINGS

With the above and other objects and advantages in view, the present invention will become more clearly understood in connection with the detailed description of preferred embodiments, when considered with the accompanying drawings, which.

DETAILED DESCRIPTION OF THE PREFERRED EMBODIMENTS

Figure 1:
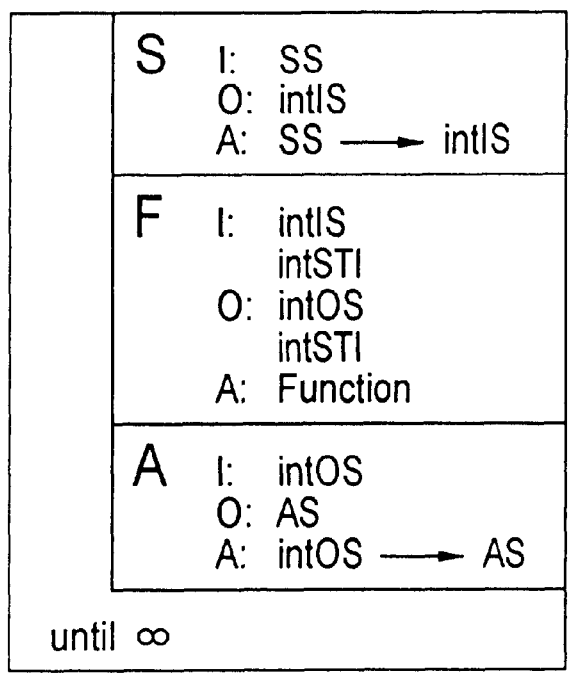
FIG. 1 is a structure diagram as first embodiment.
Figure 2:
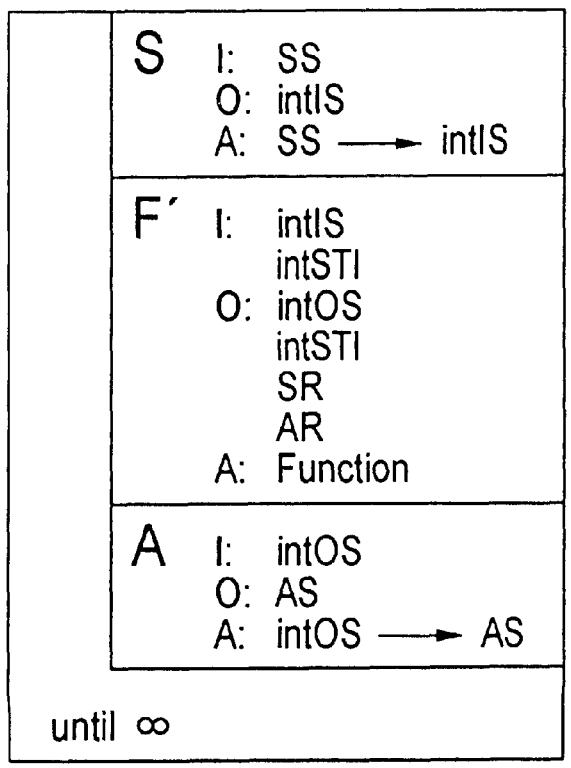
FIG. 2 is a structure diagram as second embodiment.

Each of FIGS. 1 and 2 shows a program consisting of three modules, namely a first module S, a second module F or F' respectively, and a third module A. The module S contains sensor signals SS as input variable I and produces internal input signals intIS as output variable O. The action A of the module S therefore consists of a transformation of the sensor signals SS into internal input signals intIS. This function can be developed differently, depending on the requirements, and the properties of the individual sensors. Thus, for instance, in the case of an analog sensor, after an analog-to-digital conversion, a compensation of non-linearities or of an offset of the sensor can take place. If, for a subsequent processing of the internal input signals also in the case of an analog sensor, only one binary internal input signal is required—for instance whether the speed of the vehicle is above or below a threshold—the threshold comparison can be carried out already in the module S.

In the module F, the functions necessary for the open-loop or closed-loop control are carried out. The internal input signals intIS and internal status information intSTI are fed to the module F as input variables. As output variables O, the module F produces internal output signals intOS and internal status information intSTI. The action of the module F corresponds to the required course of the function. This can for instance be a desired/actual comparison in the case of a closed-loop control. However, it may also consist of logic operations. They can be processed either independently of time—for instance if a warning light is to be lit when at least one of several sensors, developed as safety switch, reports an error.

The connecting of the internal input signals intIS can however be dependent on a sequence of the occurrence of given conditions of the internal input signals intIS. If, for instance, an internal output signal intOS is to be produced when a binary internal input signal (or sensor signal) assumes a predetermined state after an analog internal input signal has exceeded a predetermined threshold value, the following processing then takes place in the module F: First of all, the internal input signal intIS is continuously compared with a stored threshold value. If the internal input signal intIS exceeds the threshold value, a predetermined bit of the internal status information is set. It serves as one of the input variables I upon the further processing in the module F. If then the predetermined state of the binary input signal occurs, a corresponding internal output signal intOS is produced.

The module A contains the internal output signals intOS and converts them into actuator signals AS, which are then, after suitable power amplification, fed to the actuators. As actuators, use may be made of servomotors, electromagnetic actuators such as for instance solenoid valves, as well however as indicating devices such as, for instance, warning lamps or buzzers.

In the embodiment shown in FIG. 2, signals SR for the sensor request and AR for the actuator request are furthermore formed in the module F'. In this way, it is made possible that, depending on the requirements, on basis of the internal input signals and the internal status information, the running of module S and/or A can be temporarily dispensed with, in whole or in part, with respect to individual sensors or actuators. In this way, the program cycle time can be substantially reduced in many cases of use.

Figure 3:
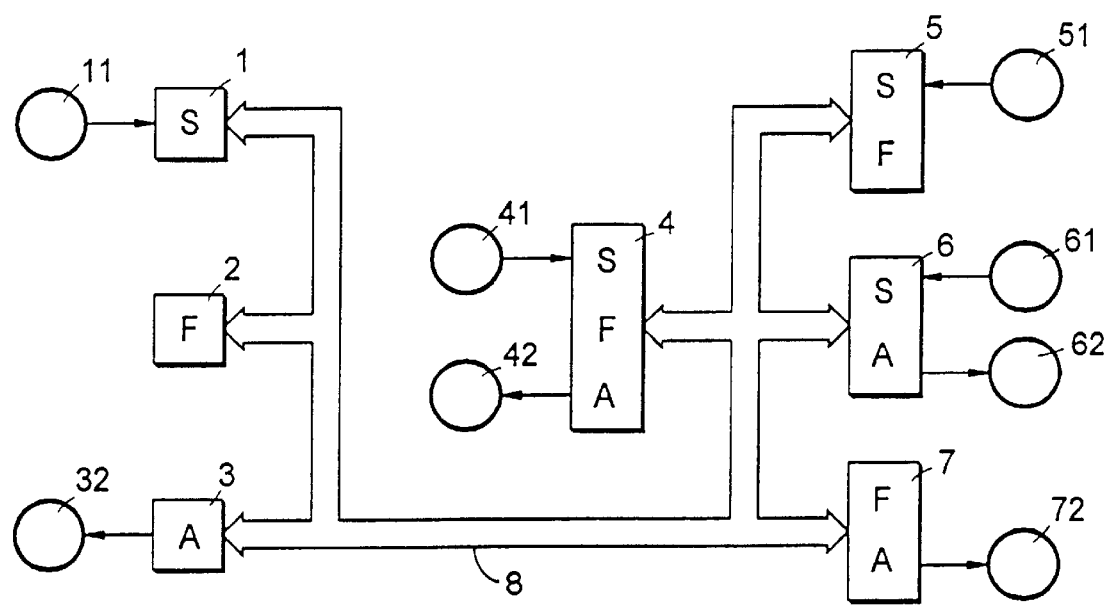
FIG. 3 is a block diagram of a system which consists of several subsystems.

FIG. 3 shows, in the form of a block diagram, a system having several data processing devices as subsystems 1 to 7, which are connected to each other by a bus 8. As subsystems all possible combinations with one or more of the modules S, F, or A are shown. How many and what subsystems are required in the specific case depends on the corresponding requests. Generally, in each case a subsystem is formed by a microcomputer (processor, microcontroller, or the like). Depending on the use, in detail, in particular those subsystems which receive only sensor signals and forward them as internal input signals or which control actuators contain relatively simple circuits, for instance analog-to-digital converters or digital-to-analog converters. In each case, however, an interface for the bus 8 is necessary.

The subsystem 1 has merely one program module S and serves to convert the sensor signals of one sensor or several sensors 11 into internal input signals, which can be fed to other subsystems over the bus 8.

The subsystem 2 contains a module F and is therefore able only to process functions, for which internal input signals and internal status information can be fed over the bus 8, while the internal output signals produced by the subsystem 2 and internal status information are fed via the bus 8 to one of the subsystems 3, 4, 6 or 7, which are able to control actuators 32, 42, 62, 72.

The subsystem 3 is connected to an actuator 32 and has only a program module A, and therefore converts internal output signals fed over the bus 8 into actuator signals.

All modules are present in subsystem 4, so that it, in itself, can independently carry out open-loop or closed-loop control tasks. Accordingly, one of more sensors 41 and actuators 42 are connected.

Another possible variant is represented by the subsystem 5 having the modules S and F. A sensor 51 is connected in corresponding manner.

The subsystem 6 has modules S and A, with at least one sensor 61 and one actuator 62, while the subsystem 7 contains the modules F and A and is connected to an actuator 72.

The following information is exchanged over the bus 8: Internal input signals, internal status information, and internal output signals. By these three types of information, assurance is had that any subsystem has the possibility of receiving all necessary information required for the carrying out of the implemented actions.

In order to permit cooperation in accordance with the structuregram of FIG. 2, sensor requests and actuator requests are furthermore necessary they being transmitted also over the bus 8. In this case, it is not permissible for several functions to act simultaneously on an actuator. Since the functions operate independently of each other, no unambiguous commands would result for such an actuator. It is therefore provided that a function must associate the corresponding actuator to itself before it sends actuator signals to that actuator. This association can only be effected if the actuator is free, and therefore is not assigned to any other function and can definitely change during the operation of the system. Therefore, it is necessary to do away with an association which has been effected.

Therefore, there are two further items of information which the subsystems must exchange with each other, namely the association and the release of the actuators, for instance in the form "lock actuator" and "release actuator".

I claim:

1. A method of producing actuator signals as a function of sensor signals in an open-loop and/or closed-loop control system, comprising the steps of:

reading the sensor signals into a data processing device and converting the sensor signals into internal input signals;

employing a first subsystem to perform a first function on said internal input signals resulting in a status of said first function;

evaluating the internal input signals together with stored status information of said first function by use of at least one of further predetermined functions to obtain an evaluation;

deriving internal output signals from said evaluation;

deriving actuator signals from the internal output signals; and forwarding the internal output signals to at least one actuator.

2. A method according to claim 1, wherein in said reading step, an entry of the sensor signals into the data processing device is furthermore dependent on the internal status information.

3. A method according to claim 1, wherein the forwarding of the actuator signals to at least one actuator is dependent on the internal status information.

4. A method according to claim 1, wherein several data processing devices are connected together by a bus system, the method further comprising the steps of:

transmitting the internal input signals, the internal output signals, and the internal status information upon requirement from one of said data processing devices which produce the signals and the information to at least one other of said data processing devices via the bus system.

5. A method according to claim 4, further comprising a step of:

transmitting sensor request signals and actuator request signals over the bus system.

6. A method according to claim 4, further comprising a step of:

after a successful request of said actuator by one of said data processing devices, blocking the requested actuator for other data processing devices.

7. A method according to claim 4, further comprising a step of:

transmitting status signals designating a block and a release of an actuator over the bus system.

8. A method according to claim 1, further comprising a step of producing and storing new status information.

9. A method according to claim 1, wherein, in said evaluating step, there is an observing of at least one of a sensor signal and a corresponding internal input signal for comparing the internal input signal with a threshold, and a setting of a bit in said stored status information designating a value of the internal input signal with the threshold.

* * * * *